United States Patent [19]

Bouty et al.

[11] 3,865,992

[45] Feb. 11, 1975

[54] ELECTRONICALLY CONTROLLED RING-TRAP CIRCUIT

[75] Inventors: Lucien Robert Bouty, Fresnes; Gerard Marcel LeCardonnel, Neuilly-sur-Seine, both of France

[73] Assignee: International Standard Electric Corporation, New York, N.Y.

[22] Filed: Nov. 15, 1972

[21] Appl. No.: 306,594

[30] Foreign Application Priority Data

Nov. 17, 1971 France .............................. 71.41072

[52] U.S. Cl. .............................. 179/18 HB, 179/84 A

[51] Int. Cl. .............................................. H04m 3/04

[58] Field of Search ............ 179/18 HB, 84 L, 84 A

[56] References Cited

UNITED STATES PATENTS

| | | | |
|---|---|---|---|
| 3,341,665 | 9/1967 | Merkez et al. | 179/84 L |
| 3,469,036 | 9/1969 | Kimeri | 179/84 L |
| 3,746,798 | 7/1973 | Thomas | 179/18 HB |

*Primary Examiner*—Kathleen H. Claffy
*Assistant Examiner*—Mitchell Saffian
*Attorney, Agent, or Firm*—Delbert P. Warner; James B. Raden

[57] ABSTRACT

This circuit detects when the handset of a telephone station is lifted and energizes a conventional relay to shut off ringing, thus avoiding use of a special ringing trip relay. The circuit comprises a resistor in series with the line, a filter across the resistor, and a diode-photo-transistor couple connected to the output of the filter. The couple is controlled by the D.C. potential difference across the resistor to control a relay in series with the photo-transistor.

As an alternative embodiment, a transistorized switch is inserted between the filter and the diode-phototransistor couple to shunt the filter in order to transmit a greater part of the line current to the diode. These two circuits normally consume no current, which allows them to be permanently connected to the ringing current generator.

7 Claims, 4 Drawing Figures

ELECTRONICALLY CONTROLLED RING-TRAP CIRCUIT

BACKGROUND OF THE INVENTION

1. Field of the Invention

The present invention concerns a ring-trip circuit used in telephone exchanges for detecting when a called subscriber lifts his handset and for immediately stopping the transmission of the ringing current.

2. Description of the Prior Art

In a telephone installation, calls to a subscriber are made by transmission along his line, from the exchange, of an A.C. current which causes his telephone to ring. This current generally originates from a relatively high A.C. voltage source (many tens of volts) at a frequency of some tens of Hertz. Immediately after the subscriber lifts his handset, the transmission of the ringing-current must be stopped so as to prevent the latter from being percieved in the subscriber's receiver. To that end, it is a general current practice to connect to the exchange, in series with the ringing A.C. current source, a D.C. current source. As long as the subscriber's handset remains on the cradle, only the ringing circuit is connected to the line wires. A capacitor, in the ringing circuit, prevents the flow of D.C. current. When the subscriber lifts his handset, the ringing circuit is disconnected from the line wires and the speech circuit is connected to them instead, thus enabling the flow of D.C. current without, however, preventing the flow of ringing A.C. current. Detection of handset lifting of a called-subscriber's station is performed by detecting the flow of D.C. current along the line wires, in the presence of the ringing current. It will be realized that such an operation, entrusted to a ring-trip circuit, presents some difficulties because of the high voltage and the low frequency of the ringing current.

Various circuits are known which employ relays specifically designed to accomplish this operation, but which are costly and present disadvantages such as; large volume, great weight, difficulty in adjustment, etc. Since the present tendency is to make use as far as possible of electronic components, it has become advisable to realize an electronic ring-trip circuit from which one will expect reduction in volume and weight, absence of all adjustment, improvement in flexibility, long life, etc.

SUMMARY OF THE INVENTION

The present invention therefore provides an electronic ring-trip circuit fulfilling this function, and solving all the above mentioned difficulties, while affording the desired advantages; all in a very economical fashion.

This circuit is characterized in that it comprises, namely, a photoemissive detecting circuit associated with the telephone line as well as a switching circuit optically coupled with the detecting circuit and controlled by this latter such that in the presence of a current flowing along the line the detecting circuit should operate and emit a luminous flux having for its function to control the operation of the switching circuit.

Moreover, there is provided between the telephone line and the detecting circuit, a filter which blocks the ringing A.C. current.

BRIEF DESCRIPTION OF THE DRAWINGS

Different features of the invention will become apparent from the description that follows, given by way of non-limiting example, in conjunction with the accompanying drawings in which.

DETAILED DESCRIPTION OF THE INVENTION

Figure 1:
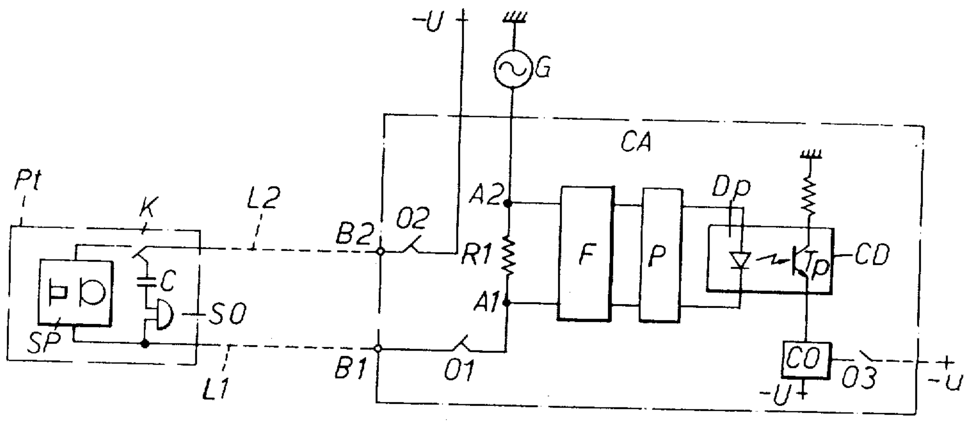
FIG. 1 is a diagram of an embodiment of a ring-trip circuit according to the present invention.

Referring to FIG. 1, there will first be described the diagram of an embodiment of the ring-trip circuit of the present invention.

This diagram comprises a telephone station Pt, a two wire telephone line L1 and L2, and a ring-trip circuit CA.

The telephone station Pt is connected to the wires L1 and L2. It has a ringing circuit comprising —in addition to the ringing element SO— the capacitor C, a speech circuit SP and a contact K, controlled by the switch-hook of the subscriber's station.

The telephone line is connectable to the terminals B1 and B2 such as to be current-supplied by a D.C. current source, between a null value potential (earth) and a −U potential, and by a ringing A.C. current source G positioned, in this case, in series with the current-supply terminal connected to the earth.

The ring-trip circuit CA comprises a resistor R1 positioned in series between wire L1 and generator G; a low-pass filter F, connected to the terminals A1 and A2 of resistor R1, for eliminating the A.C. current; a protection circuit P connected to the output of filter F for limiting the voltage originating from the line; a phototransistor-diode couple CD connected to circuit P; a switching device CO operating under the control of the phototransistor-diode couple CD and controlling the operation of contacts 01, 02 and 03.

The phototransistor-diode couple CD is made up of a photoemissive diode Dp emitting light or a luminous flux, i.e., a radiant flux in the visible-wavelength range, when it has a current flowing through it, and a phototransistor Tp becoming conductive under the influence of the luminous flux originating from the diode, and received upon its base.

If it is assumed that the line wires L1, L2, are connected to terminals B1, B2, and, that contacts 01, 02 are in rest condition as shown in FIG. 1, then the line is current-supplied by the D.C. current source. When the handset of station Pt is replaced on its cradle, contact K is in rest condition. An A.C. current flows along the line wires L1, L2 through the ringing circuit of the station Pt, causing the ringing element SO to operate; but no D.C. current can flow because of the presence of capacitor C in the ringing circuit. The difference in potential at terminals A1 and A2 of resistor R1 varies as the frequency of the A.C. current. Filter F prevents the flow, through circuit P and diode Dp, of a current resulting from the A.C. potential difference.

When the station Pt subscriber lifts his handset, contact K changes condition. The ringing circuit (SO-C) is disconnected (ringer SO ceases to operate), whereas the speech circuit SP is connected to wires L1, L2. The D.C. current provided by the D.C. source can flow along wires L1, L2 and through the speech circuit SP of subscriber's station Pt. At the terminals A1 and A2 of resistor R1 there appears a difference of potential resulting from this D.C. current such that the potential of terminal A2 is higher than the potential of terminal A1. A D.C. current therefore flows between points A2 and A1 through filter F, protection circuit P, and diode Dp. The current flowing through diode Dp determines in this latter the emission of a luminous flux, or light which reaches the base of phototransistor Tp. This latter becomes conductive and controls the operation of the switch device CO. Contacts 01 and 02 open and isolate the wires L1, L2. The subscriber's station Pt therefore stops receiving A.C. current. Moreover, contact 03 closes, and provides an appropriate $-u$ potential, transmitted through means not shown in the figure, so as to maintain the switching device CO in operation. The circuit stays in that condition until removal of the $-u$ holding potential provided to the contact 03. At removal of this potential, the switching device CO and, subsequently, the entire circuit restores to its initial condition.

It is seen therefore that the ring-trip circuit CA has indeed made it possible to detect the lifting of the handset of subscriber's station Pt, and to stop the transmission of the A.C. current to that station.

In referring to FIG. 2, there will now be described in detail an embodiment of the ring-trip circuit CA of FIG. 1.

Filter F is realized by means of resistors R3, R4 and capacitors C1 and C2.

Protection circuit P is realized by means of diodes such as Di1 and Di2 connected in parallel and in opposition. These have a conductivity threshold and they will limit to the value of this threshold any voltage provided by the filter F, whatever may be the polarity, so as to protect the photo-emissive diode Dp.

The switching device CO comprises a voltage divider (R5, R6), a transistor circuit (T1, T2) of the Darlington type and its biasing resistors, a relay O and a diode Di3.

When the phototransistor Tp is blocked, no current flows in the voltage divider R5, R6. The base of transistor T1 is at —U negative potential and the transistor T1 is blocked. Transistor T2 is also blocked. No current flows in relay O which remains in its rest condition.

When the phototransistor Tp is made conductive, a current flows in the voltage divider R5, R6. Potential of the base of transistor T1 becomes less negative. The transistor T1 becomes conductive as well as the transistor T2. A current flows in relay O. To release this relay it is just necessary to provide along wire RZ a positive potential having for its function the blockage of the diode D:3.

It is seen therefore that the ring-trip circuit CA has one part which comprises the resistor R1, the filter F, the protection circuit P and the diode Dp, galvanically connected to the line without any other current-supply than that provided by the currents flowing along the line. A second part, comprising the phototransistor Tp and the switching device CO, is electrically isolated from the first part, and thus from the line. The A.C. current as well as any parasitic along the line have not therefore any direct effect upon the circuits of the second part and, in particular, upon the current-supply circuits of the electronic circuits.

Furthermore, the ring-trip circuit CA evaluates the difference of potential existing at the terminals of resistor R1 inserted in series on the line. The ringing AC current can therefore give way (according to the value of resistor R1) to a low difference of potential; and this enables choosing, for C1 and C2, small size tantalum capacitors. Moreover, the current flowing in the circuit CA results from the difference of potential at the terminals of R1 and not from the value of the potential along the line; and this protects the circuit CA against the influence of parasitics and accidental over-voltages.

Moreover, in rest condition, for instance when the line is disconnected from terminals B1 and B2, the ring-trip circuit does not consume any current. Indeed, as is already mentioned above, the phototransistor Tp and the transistors T1 and T2 are blocked. This feature is very interesting when considering the large number of ring-trip circuits in a telephone exchange.

Figure 3:
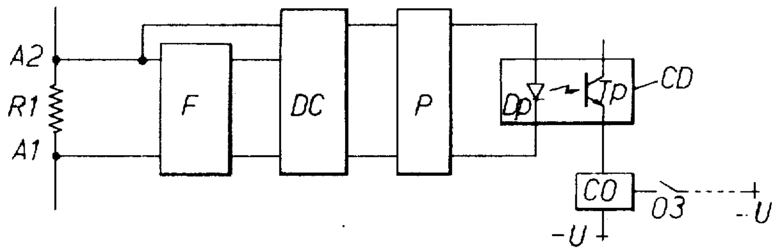
FIG. 3 is a diagram of an alternative ring-trip circuit of use in the present invention.

Referring to FIG. 3, the diagram will now be described of an alternative embodiment of the ring-trip circuit in the present invention.

In this figure, a switching circuit DC has been intercalated between filter F and protection circuit P. This circuit DC operates when a D.C. current flows in the resistor R1 (handset lifting of the subscriber's station Pt). It then connects the terminal A2 of resistor R1 directly to the protection circuit P onto the photoemissive diode Dp, thus, eliminating filter F. Diode Dp can therefore be flown through by a current higher than the current provided to it in the circuit of FIG. 1; yet it receives a portion of this A.C. current. The luminous flux, or light, emitted by diode Dp is therefore greater and operation of the ring-trip circuit as a whole will be more rapid.

Figure 4:
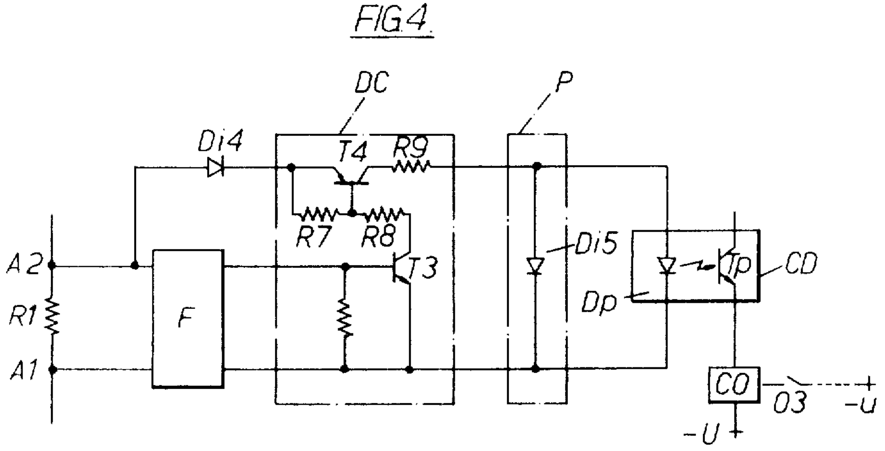
FIG. 4 is a detailed embodiment of the circuit of FIG. 3.

In referring to FIG. 4, there will finally be described a detailed embodiment of the ring-trip circuit in FIG. 3, and more specially, of the circuits DC and P.

Figure 2:
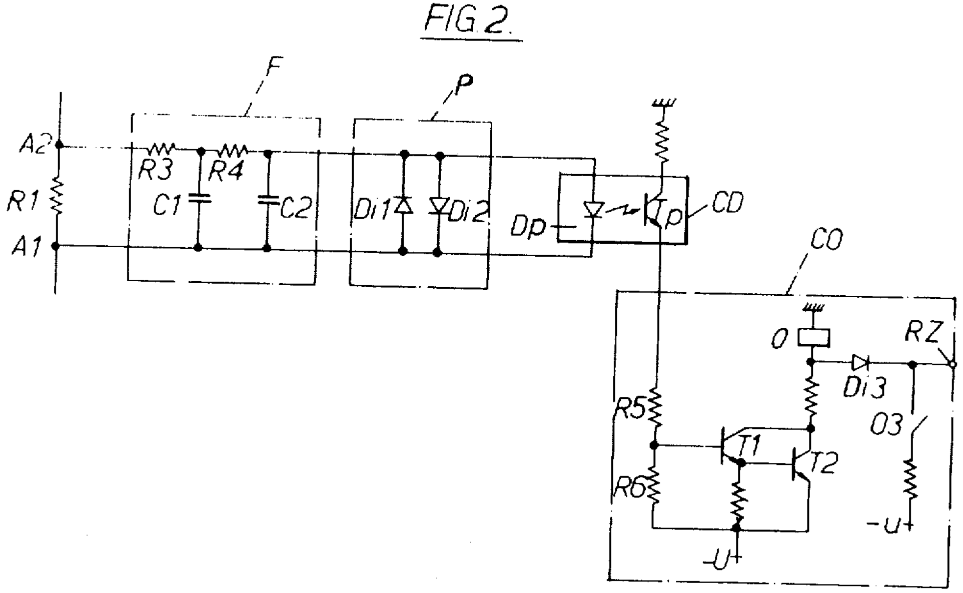
FIG. 2 is a detailed embodiment of the ring-trip circuit of FIG. 1.

Filter F and the device CO can be realized as shown in FIG. 2.

The switching circuit DC comprises two transistors T3 and T4. When no D.C. current flows in the resistor R1, the transistor T3 is blocked. The base of transistor T4 is at the same potential as its emitter; therefore, it is also blocked, preventing the flow of a current in diode Dp.

When a difference of potential, resulting from the flow of D.C. current appears upon the terminals A2 and A1 of resistor R1, such that the potential of A2 is higher than the potential of A1, the transistor T3 is rendered conductive. A current flows between terminals A2 and A1 through diode Di4, resistors R7 and R8, transistor T3 and filter F. Potential of the base of transistor T4 becomes negative. Transistor T4 becomes conductive and enables the flowing of current from terminal A2 onto terminal A1, through diode Dp. Thus, a fraction of the A.C. current is transmitted along the line through diode Dp. Whereas, a protection diode Di4 blocks the negative portion of the current; and, one or several diodes such as Di5 of the protection circuit P will protect diode Dp against too high currents.

Diode Dp will therefore flicker, but the control circuit of relay O (FIG. 2) comprising the phototransistor Tp can easily be provided with an integrating capacitor ensuring continuous control of the relay.

It is seen therefore that the circuit in FIG. 4 accomplishes the functions defined in the description of FIG. 3, but in a more efficient manner, the energy received by diode Dp being higher.

It is understood that the foregoing description of a specific embodiment of this invention is made by way of example only and is not to be considered as a limitation on its scope.

We claim:

1. A ring-trip circuit comprising a photoemissive detecting circuit associated with a telephone line, said photo-emissive detecting circuit including photoemissive means and photosensitive means, a switching circuit optically coupled via the photo sensitive means to the photoemissve means and controlled by the latter, filter means coupling the photoemissive means to the telephone line to restrict the transmission of alternating current to the photoemissive means, said photoemissive means responding to direct current along the telephone line to emit light and complete the optical couple to the switching circuit, the switching circuit including contacts over which alternating ringing current signals are supplied to the telephone line, and the switching circuit responding to completion of said optical couple to open said contacts and remove alternating ringing current from the line.

2. A circuit as defined in claim 1, in which the photoemissive detecting circuit includes a photo-emissive diode emitting light under the influence of a current flowing through it; and the switching circuit includes a phototransistor which is conductive when it receives light on its base.

3. A ring-trip circuit comprising a photo-emissive detecting circuit associated with a telephone line, a switching circuit optically coupled via photo sensitive means to the photoemissive circuit and controlled by the latter, the detecting circuit responding to direct current along the telephone line to emit light and complete the optical couple to the switch circuit, the switching circuit including contacts over which alternating current ringing signals are supplied to the telephone line, the switching circuit responding to completion of said optical couple to open said contacts and remove alternating ringing current from the line, a resistor coupled in series on one wire of the line, means connecting the detecting circuit to the terminals of that resistor in a manner such that the operation of the circuit is dependent only upon the current flowing in the resistor, and a filter connected between the line and the detecting circuit to eliminate the influence of the ringing current and to provide a current to the detecting circuit only when direct current flows along the line.

4. A circuit as defined in claim 3, in which a protection circuit is connected between the line and the detecting circuit to protect the detecting circuit against too strong current flowing along the line.

5. A circuit as defined in claim 4, in which the protection circuit includes two diodes connected, in parallel and in opposition one with respect to the other, to the terminals of the detecting circuit.

6. A circuit as defined in claim 3, in which an additional switching circuit is coupled between one side of the transmission line and the photoemissive detector to operate when direct current flows along the line and couples the detecting circuit directly with the line, and, thus, short-circuits the filter to transmit alternating current to the detecting circuit.

7. A circuit as defined in claim 6, in which a diode is connected in series with said additional switching unit to enable the flow of direct current and alternating current in one direction through the detecting circuit, thereby altering the magnitude of the luminous flux from the photoemissive detector in accordance with the sum of the direct current and the alternating current.

* * * * *